(12) United States Patent
Maekawa et al.

(10) Patent No.: US 8,600,527 B2
(45) Date of Patent: Dec. 3, 2013

(54) ACCELERATION/DECELERATION CONTROL DEVICE

(75) Inventors: Kiyoshi Maekawa, Chiyoda-ku (JP);
Yuko Takehana, Chiyoda-ku (JP);
Satoshi Mizogami, Chiyoda-ku (JP);
Masahiko Hirano, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 206 days.

(21) Appl. No.: 12/988,283

(22) PCT Filed: May 29, 2008

(86) PCT No.: PCT/JP2008/059941
§ 371 (c)(1),
(2), (4) Date: Oct. 15, 2010

(87) PCT Pub. No.: WO2009/144805
PCT Pub. Date: Dec. 3, 2009

(65) Prior Publication Data
US 2011/0035028 A1 Feb. 10, 2011

(51) Int. Cl.
*G05B 11/32* (2006.01)
(52) U.S. Cl.
USPC .............. 700/69; 318/561; 702/141; 700/245
(58) Field of Classification Search
USPC ...................... 700/69, 245; 702/141; 318/561
See application file for complete search history.

(56) References Cited

U.S. PATENT DOCUMENTS

| | | | | |
|---|---|---|---|---|
| 3,828,236 A | * | 8/1974 | Close | 318/561 |
| 4,354,577 A | * | 10/1982 | Yonemoto | 187/295 |
| 5,528,506 A | * | 6/1996 | Yoshida et al. | 700/188 |
| 2003/0009260 A1 | * | 1/2003 | Tanaka et al. | 700/245 |
| 2006/0206284 A1 | * | 9/2006 | Hirabayashi | 702/141 |
| 2008/0147280 A1 | * | 6/2008 | Breed | 701/46 |
| 2010/0023296 A1 | * | 1/2010 | Huang et al. | 702/141 |

FOREIGN PATENT DOCUMENTS

| | | |
|---|---|---|
| CN | 1833830 A | 3/2006 |
| JP | 57-9678 A | 1/1982 |
| JP | 63-120313 A | 5/1988 |
| JP | 05-127731 A | 5/1993 |
| JP | 05-316780 A | 11/1993 |
| JP | 06-008166 A | 1/1994 |
| JP | 06-182682 A | 7/1994 |
| JP | 08-006627 A | 1/1996 |
| JP | 09-198144 A | 7/1997 |
| JP | 2000-020118 A | 1/2000 |
| JP | 2000-148251 A | 5/2000 |

OTHER PUBLICATIONS

Chinese Office Action dated Jul. 4, 2012 issued in Chinese Patent Application No. 200880129475.3.

* cited by examiner

Primary Examiner — Mohammad Ali
Assistant Examiner — Anthony Whittington
(74) Attorney, Agent, or Firm — Sughrue Mion, PLLC

(57) ABSTRACT

A residual-velocity calculating unit calculates a residual velocity that corresponds to a velocity increment when an acceleration is reduced from a current command acceleration to zero according to an acceleration reduction curve. A differential-velocity calculating unit calculates a differential velocity vs=v0-vn, which is a difference between a target velocity v0 and a current velocity command for every command generation period. An acceleration-reduction-start-timing determining unit compares the residual velocity to the differential velocity for determining whether acceleration reduction starts. When a condition that the residual velocity is equal to or larger than the differential velocity is satisfied, the acceleration-reduction-start-timing determining unit determines the start of the acceleration reduction and starts to reduce the command acceleration according to the acceleration reduction curve generated by the command generating unit.

5 Claims, 10 Drawing Sheets

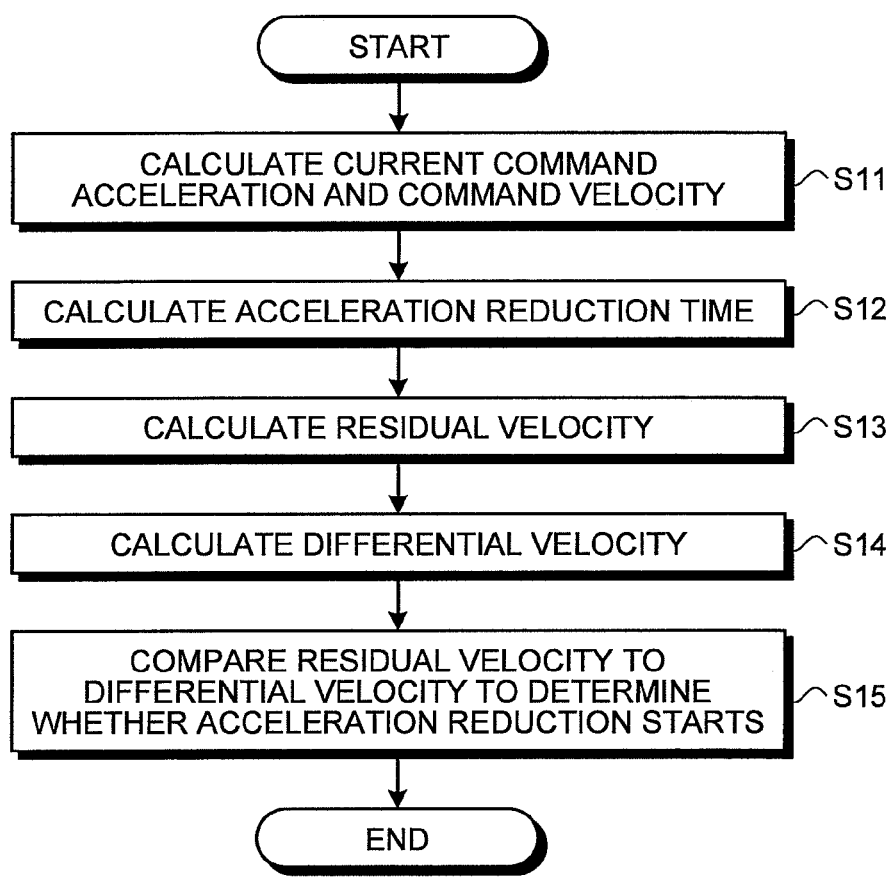

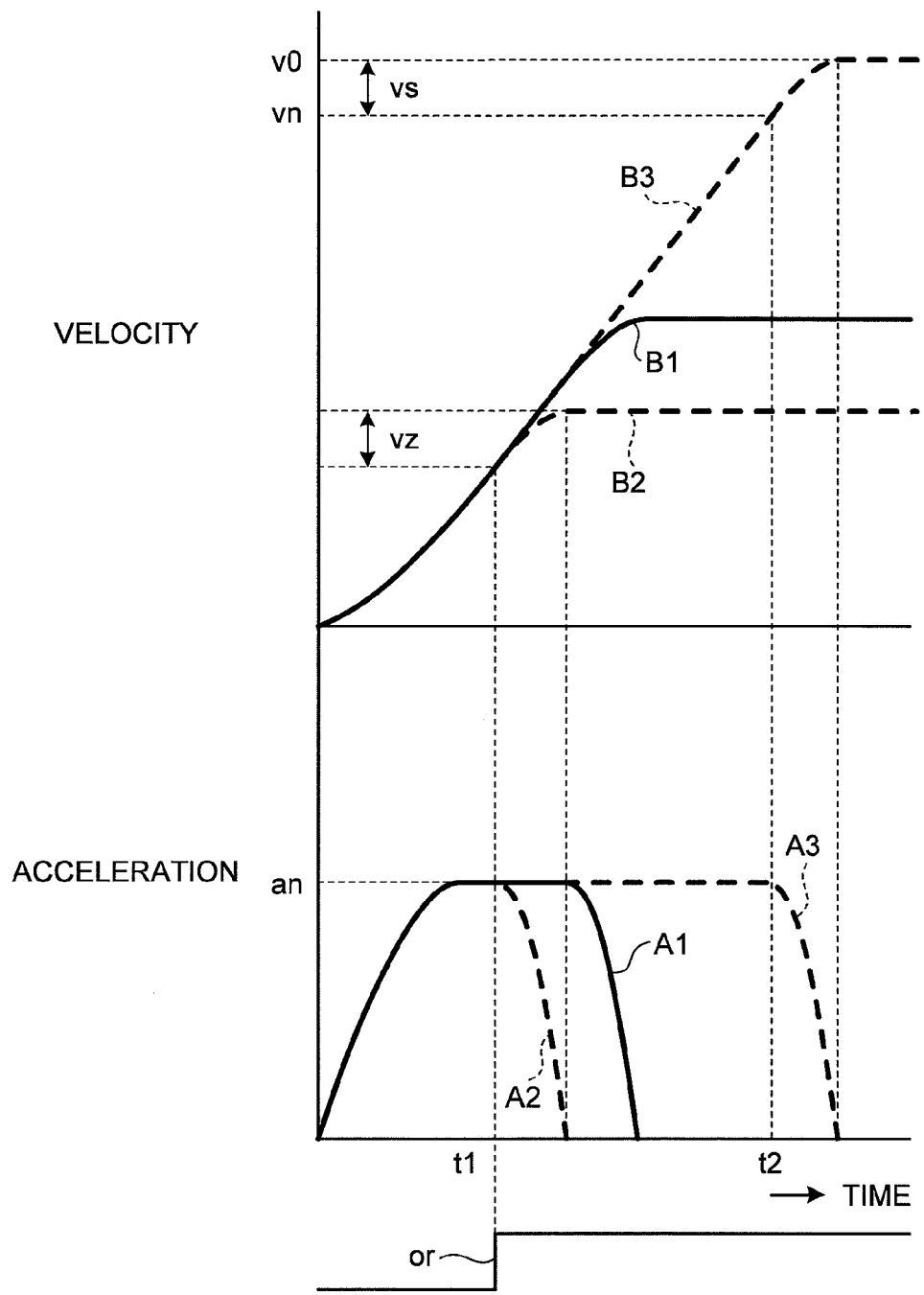

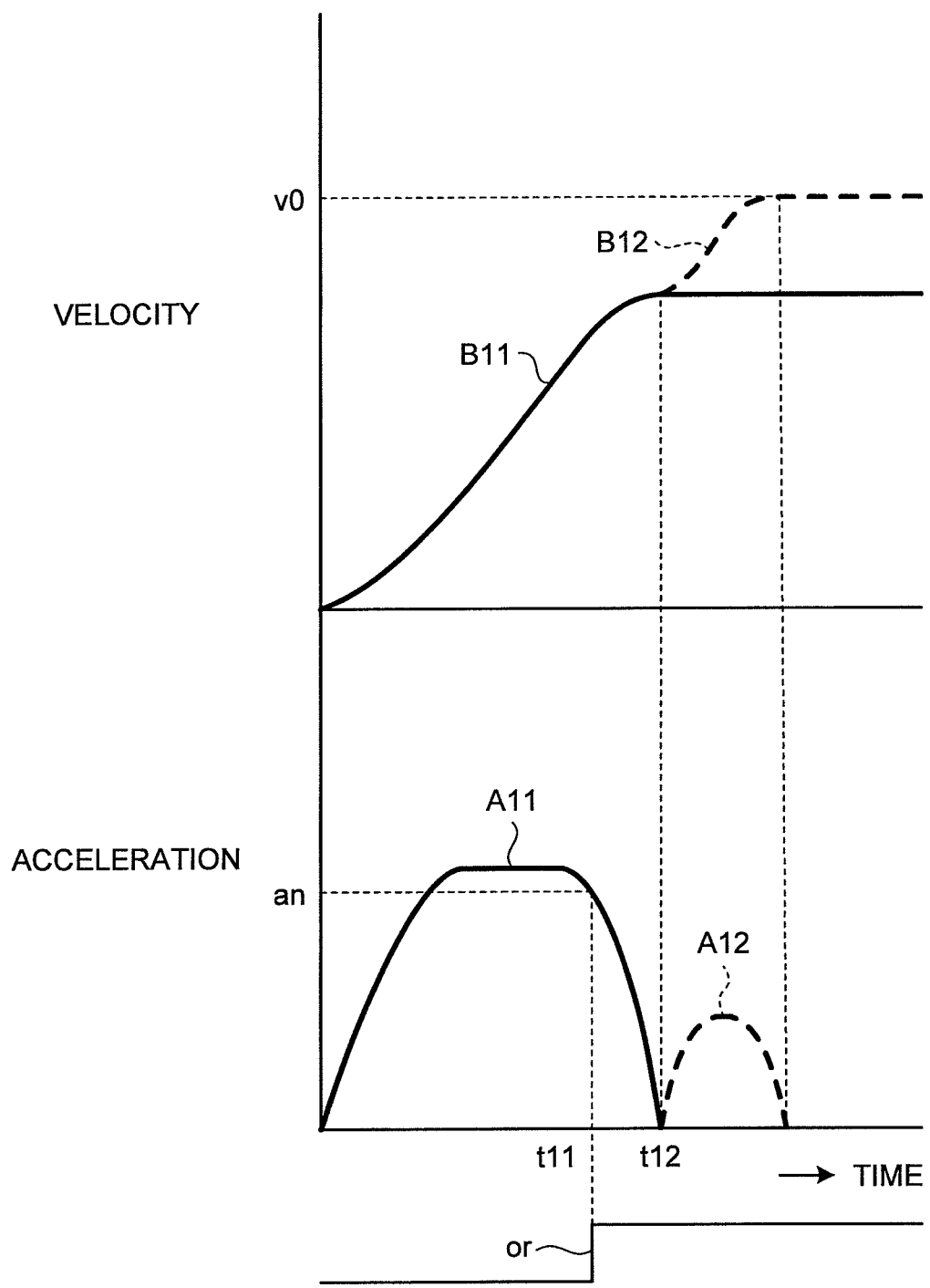

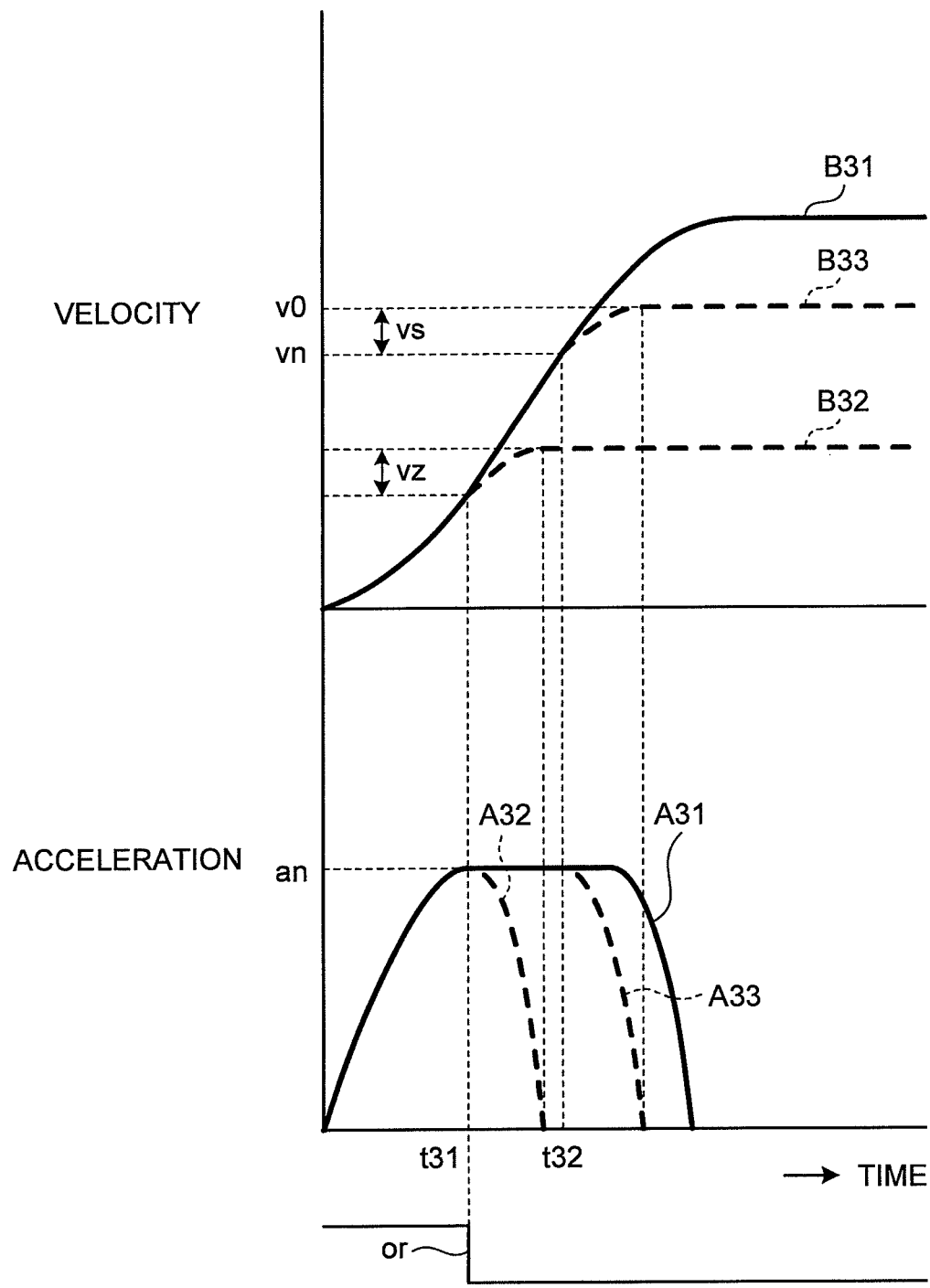

ACCELERATION/DECELERATION CONTROL DEVICE

CROSS REFERENCE TO RELATED APPLICATIONS

This application is a National Stage of International Application No. PCT/JP2008/059941 filed May 29, 2008 the contents of all of which are incorporated herein by reference in their entirety.

TECHNICAL FIELD

The present invention relates to an acceleration/deceleration control device, and more particularly to a method of generating an acceleration command curve when a target-velocity change command is input during acceleration.

BACKGROUND ART

In velocity control during acceleration/deceleration in controlling a robot or the like, a velocity command is generated from a smooth curve such as an S-curve in view of smooth operations and the lifetime of rods. To simply and accurately calculate velocity commands during acceleration/deceleration of a robot from multi-dimensional curves including an S-curve, an ideal acceleration/deceleration curve is stored in a data table and the data table is scaled according to a velocity difference and an acceleration/deceleration time during acceleration/deceleration, so that a velocity command can be generated for each time (Patent Document 1).
Patent Document 1: Japanese Patent Application Laid-open No. H6-182682

DISCLOSURE OF INVENTION

Problem to be Solved by the Invention

However, according to the conventional technique mentioned above, a velocity command is generated by the ideal acceleration/deceleration curve stored in the data table, the velocity difference, and the acceleration/deceleration time, and thus, when a target-velocity change command is input during acceleration and the resultant change in velocity is promptly reflected on a current velocity, there is a problem that the acceleration becomes discontinuous and thus vibrations are excited.

The present invention has been achieved in view of the above problems, and an object of the present invention is to provide an acceleration/deceleration control device that can make changes in velocity reflected on a current velocity while maintaining continuity in acceleration, even when the target-velocity change command is input during acceleration.

Means for Solving Problem

To solve above-mentioned problems and to achieve the object, an acceleration/deceleration control device generates a command acceleration that is a command value of an acceleration and a command velocity that is a command value of a velocity so as to reach a target velocity according to an acceleration command curve. The acceleration/deceleration control device includes a command generating unit that generates an acceleration command curve for providing the command acceleration, and generates the acceleration reduction curve when a target-velocity change command is input during acceleration, a residual-velocity calculating unit that calculates a residual velocity that corresponds to a velocity increment when the acceleration is reduced from a current command acceleration to zero according to an acceleration reduction curve generated by the command generating unit, a differential-velocity calculating unit that calculates a differential velocity corresponding to a difference between the target velocity and a current command velocity, and an acceleration-reduction-start-timing determining unit that causes the command generating unit to generate an acceleration reduction curve based on a time when the residual velocity has become equal to or higher than the differential velocity and starts to reduce the command acceleration according to the acceleration reduction curve.

Effect of the Invention

According to the present invention, even when the target-velocity change command is input during acceleration, changes in velocity can be reflected on a current velocity while continuity in acceleration is maintained.

BRIEF DESCRIPTION OF DRAWINGS

FIG. 3 is a flowchart of a process of determining start of acceleration reduction in the acceleration/deceleration control device shown in FIG. 1.
FIG. 4-1 depicts a method of generating an acceleration command curve when a velocity is changed to be increased in an acceleration increasing section or a constant acceleration section.
FIG. 4-2 depicts a method of generating an acceleration command curve when a velocity is changed to be increased in an acceleration reducing section and exceeds a target velocity at zero acceleration.
FIG. 4-3 depicts a method of generating an acceleration command curve when a velocity is changed to be increased in the acceleration reducing section and does not exceed the target velocity at zero acceleration.
FIG. 5-1 depicts a method of generating an acceleration command curve when a velocity is changed to be reduced in the acceleration increasing section or the constant acceleration section.
FIG. 5-2 depicts a method of generating an acceleration command curve when a velocity is changed to be reduced in the acceleration reducing section.

Figure 1:
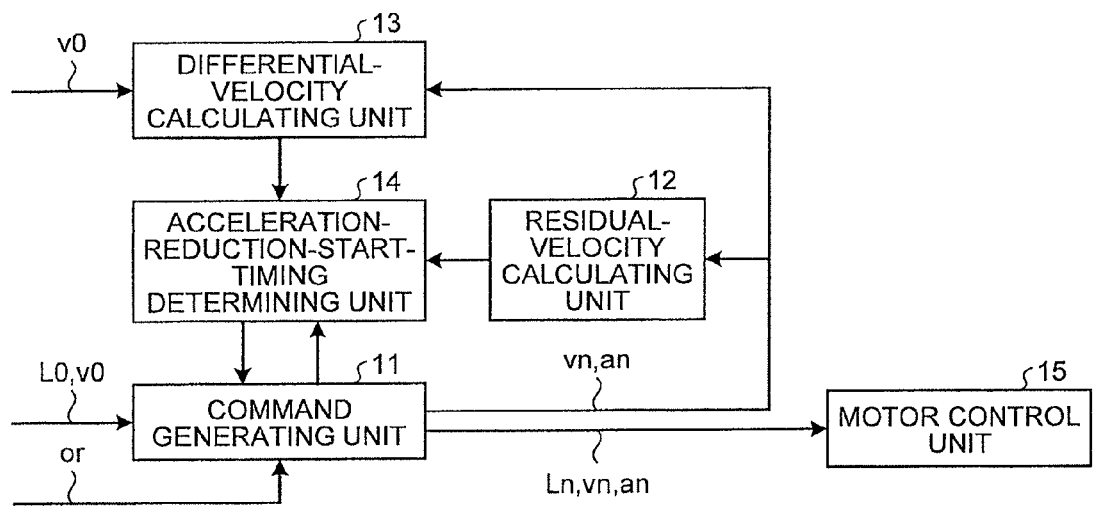
FIG. 1 is a block diagram of a schematic configuration of an acceleration/deceleration control device according to a first embodiment of the present invention.

EXPLANATIONS OF LETTERS OR NUMERALS 11, 21 Command generating unit
12, 22 Residual-velocity calculating unit
13, 23 Differential-velocity calculating unit
14, 24 Acceleration-reduction-start-timing determining unit 15, 25 Motor control unit
26 Acceleration-continuous-remaining-distance calculating unit
27 Differential-distance calculating unit
28 Deceleration-start-timing/acceleration-reduction-start-timing determining unit

BEST MODE(S) FOR CARRYING OUT THE INVENTION

Exemplary embodiments of an acceleration/deceleration control device according to the present invention will be explained below in detail with reference to the accompanying drawings. The present invention is not limited to the embodiments.

First Embodiment

FIG. 1 is a block diagram of a schematic configuration of an acceleration/deceleration control device according to a first embodiment of the present invention. In FIG. 1, the acceleration/deceleration control device includes a command generating unit 11, a residual-velocity calculating unit 12, a differential-velocity calculating unit 13, and an acceleration-reduction-start-timing determining unit 14.

The command generating unit 11 generates a command position Ln, a command velocity vn, and a command acceleration (an) so that they reach a target position L0 and a target velocity v0 and outputs them to a motor control unit 15. The command position Ln is a command value for a position, the command velocity vn is a command value for a velocity, and the command acceleration (an) is a command value for an acceleration. The command generating unit 11 generates an acceleration command curve formed of a smooth curve such as an S-curve to generate the command acceleration (an) by the acceleration command curve. When a target-velocity change command (an override change command) (or) is input to the command generating unit 11, the command generating unit 11 generates an acceleration reduction curve based on an acceleration-reduction start timing determined by the acceleration-reduction-start-timing determining unit 14 and starts to reduce the command acceleration (an) according to the acceleration reduction curve.

The residual-velocity calculating unit 12 calculates a residual velocity vz based on the command acceleration (an) generated by the command generating unit 11. The residual velocity vz corresponds to a velocity increment when an acceleration is reduced from current command acceleration (an) to zero according to the acceleration reduction curve generated by the command generating unit 11.

The differential-velocity calculating unit 13 calculates a differential velocity vs based on an externally supplied target velocity v0 and the command velocity vn generated by the command generating unit 11. The differential velocity vs corresponds to a difference between the target velocity v0 and the current command velocity vn.

The acceleration-reduction-start-timing determining unit 14 determines an acceleration-reduction start timing of starting to reduce the command acceleration (an) according to the acceleration reduction curve generated by the command generating unit 11. The acceleration-reduction start timing can be set at a time when the residual velocity vz has become equal to or higher than the differential velocity vs.

Figure 2:
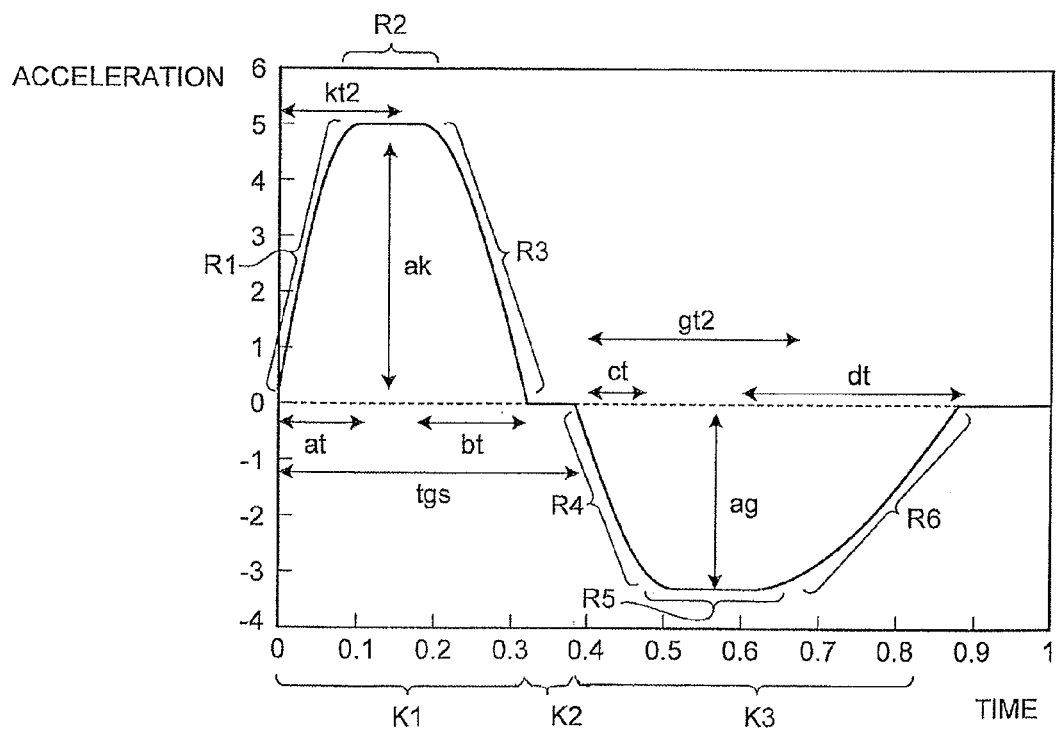
FIG. 2 is an example of an acceleration command curve generated by a command generating unit shown in FIG. 1.

FIG. 2 is an example of the acceleration command curve generated by the command generating unit shown in FIG. 1. In FIG. 2, the acceleration command curve for providing the command acceleration (an) includes an acceleration section K1, a constant velocity section K2, and a deceleration section K3. The acceleration section K1 includes an acceleration increasing section R1, a constant acceleration section R2, and an acceleration reducing section R3. The deceleration section K3 includes an acceleration reducing section R4, a constant acceleration section R5, and an acceleration increasing section R6. The acceleration increasing sections R1 and R6 and the acceleration reducing sections R3 and R4 can be set independently.

As parameters for the acceleration command curve, there can be used an acceleration increasing time at in the acceleration section K1, an acceleration reduction time bt in the acceleration section K1, an acceleration reduction time ct in the deceleration section K3, an acceleration increasing time dt in the deceleration section K3, a maximum acceleration ak, a minimum acceleration ag, a time kt2 from when acceleration starts to increase to when the acceleration starts to be reduced, a time gt2 from when the acceleration starts to be reduced to when the acceleration starts to increase, and a time tgs from when the acceleration starts to when deceleration starts.

The acceleration increasing time at is a time required for accelerating from zero to the maximum acceleration ak. The acceleration reduction time bt is a time required for decelerating from the maximum acceleration ak to zero. The acceleration reduction time ct is a time required for decelerating from zero to the minimum acceleration ag. The acceleration increasing time dt is a time required for accelerating from the minimum acceleration ag to zero.

Acceleration increasing curves in the acceleration increasing sections R1 and R6 and acceleration reduction curves in the acceleration reducing sections R3 and R4 can be represented by smooth curves such as trigonometric functions and polynomials. For example, a universal cam curve (for example, Mechanical Design, March, 1989, pp. 64 to 92) can be used as the acceleration command curve.

Figures 3, 4:
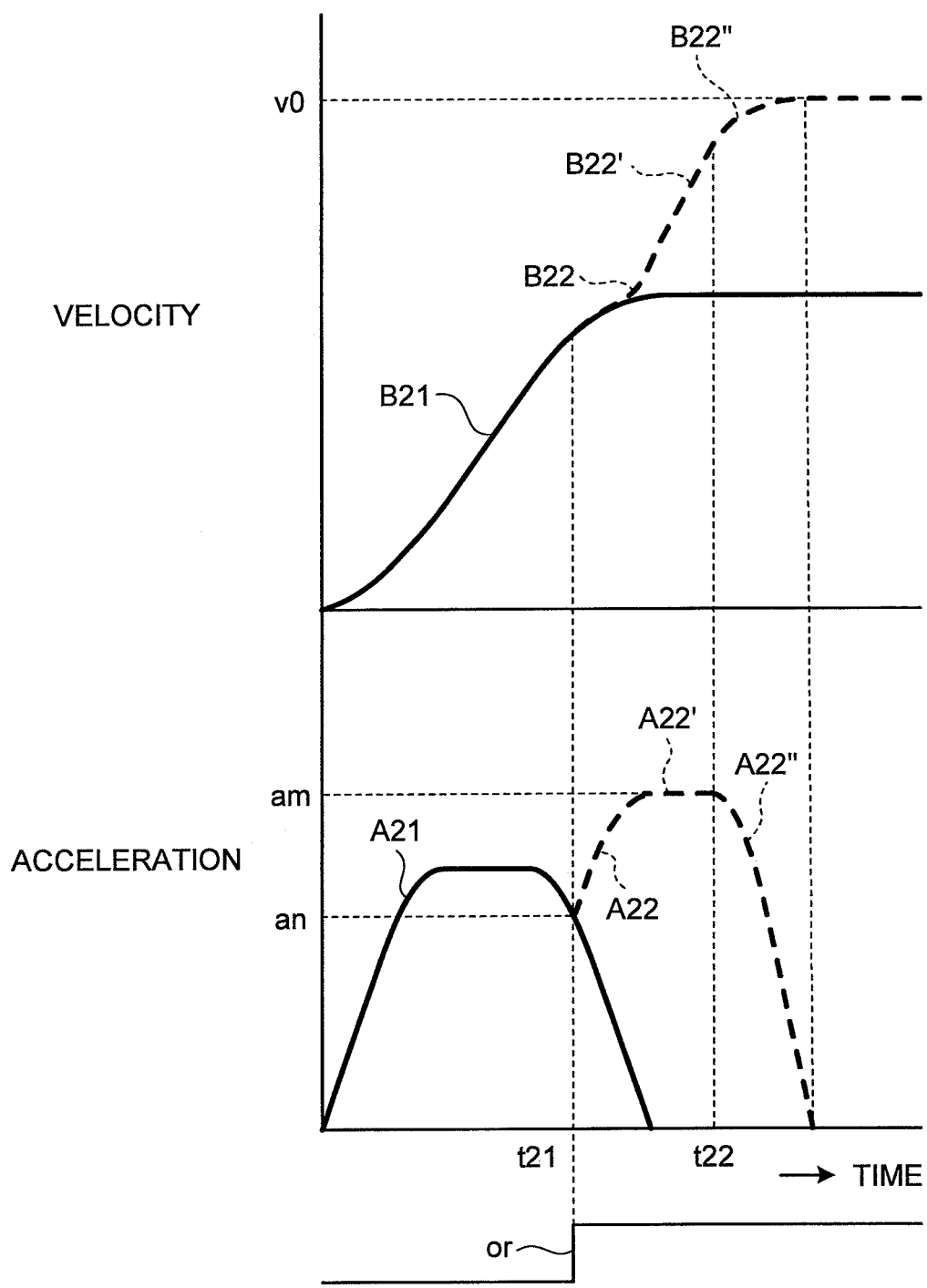

FIG. 3 is a flowchart of a process of determining start of acceleration reduction in the acceleration/deceleration control device shown in FIG. 1. In FIG. 3, when the target position L0 and the target velocity v0 are input to the command generating unit 11 shown in FIG. 1, the command generating unit 11 generates the acceleration command curve shown in FIG. 2 to calculate the command acceleration (an) and the command velocity vn for every command generation period (Step S11), and the acceleration reduction time bt (Step S12). The command generating unit 11 outputs the command acceleration (an) and the acceleration reduction time bt to the residual-velocity calculating unit 12, and the command velocity vn to the differential-velocity calculating unit 13.

The residual-velocity calculating unit 12 calculates the residual velocity vz corresponding to a velocity increment when the acceleration is reduced from the current command acceleration (an) to zero according to the acceleration reduction curve in the acceleration reducing section K3 shown in FIG. 2 (Step S13) and outputs the result to the acceleration-reduction-start-timing determining unit 14.

When the command acceleration (an) generated by the command generating unit 11 is provided by the acceleration command curve shown in FIG. 2 and an acceleration reduction curve a is represented by the universal cam curve, the acceleration reduction curve a is given by the following expression (1).

$$a = ak^* \cos(\pi^* t/2/bt) \quad (1)$$

where t denotes a time that elapses since the acceleration starts to be reduced.

When the acceleration is reduced from the current command acceleration (an) to zero according to a curve similar to the acceleration reduction curve a represented by expression (1), the time required for the acceleration becoming zero is bt*an/ak, and thus the residual velocity vz, which is a velocity increment before the acceleration becomes zero, can be calculated by the following expression (2).

$$vz = 2*bt*an*an/ak/\pi \quad (2)$$

Similarity between curves means that the curves have a relationship of being reduced or expanded in a horizontal direction or a vertical direction.

Next, the differential-velocity calculating unit 13 calculates the differential velocity vs=v0-vn, which is a difference between the target velocity v0 and the current command velocity vn for every command generation period (Step S14), and outputs the result to the acceleration-reduction-start-timing determining unit 14.

The acceleration-reduction-start-timing determining unit 14 then compares the residual velocity vz to the differential velocity vs for every command generation period to determine whether acceleration reduction starts (Step S15) and outputs an acceleration-reduction start signal for instructing a start of acceleration reduction to the command generating unit 11. The acceleration-reduction-start-timing determining unit 14 determines the start of acceleration reduction when vz≥vs, and starts to reduce the command acceleration (an) according to the acceleration reduction curve generated by the command generating unit 11.

When the target velocity v0 is the same as the one when the parameters about acceleration/deceleration (at, bt, ct, dt, kt2, and gt2 in FIG. 2) are calculated, the command acceleration (an) increases till the acceleration increasing time at elapses since acceleration starts. From when the acceleration increasing time at elapses to when the acceleration starts to be reduced, the command acceleration (an) is generated at constant acceleration. The command acceleration (an) starts to be reduced after about kt2 elapses since the acceleration starts.

When a control in the motor control unit 15 is velocity control (when a velocity of an object to be controlled is controlled), a deceleration stop position is not monitored. For example, deceleration starts when a deceleration start command is input by an upper level control device (not shown).

A method of generating the command acceleration (an) when the target-velocity change command (or) is input during an operation (when the target velocity v0 is changed during an operation, that is, when an override is changed) is explained next.

When the target-velocity change command (or) is input during an operation, the command generating unit 11 determines whether the current command acceleration (an) is in the acceleration section K1, the constant velocity section K2, or the deceleration section K3 shown in FIG. 2.

When the current command acceleration (an) is in the deceleration section K3, the target-velocity change command (or) is reflected not on the currently generated command acceleration (an), but on a command acceleration (an) to be generated next time. When the current command acceleration (an) is in the constant velocity section K2, the command acceleration an from the current command velocity vn to the target velocity v0 changed by the target-velocity change command (or) is generated using an acceleration command curve similar to the acceleration command curve shown in FIG. 2.

When the current command acceleration (an) is in the acceleration section K1, the command acceleration (an) is generated for each of cases that the velocity is changed to be increased and that the velocity is changed to be reduced, and generated for each of portions in the acceleration section K1 (the acceleration increasing section R1, the constant acceleration section R2, and the acceleration reducing section R3).

In a case that the target-velocity change command (or) is executed so that the velocity increases, when the current command acceleration (an) is in the acceleration increasing section R1 or the constant acceleration section R2, the current command acceleration (an) continues. When the residual velocity vz has become equal to or higher than the differential velocity vs, an acceleration reduction curve is generated and the acceleration starts to be reduced. A target velocity at the time of calculating the differential velocity vs is the target velocity v0 changed by the target-velocity change command (or).

Meanwhile, in a case that the current command acceleration (an) is in the acceleration reducing section R3, when an acceleration reduction curve is newly generated by the current command acceleration (an), the velocity exceeds the target velocity 0 at zero acceleration, the current acceleration reduction curve is still used. When reaching zero acceleration, an acceleration curve to the target velocity v0 is regenerated so as to be similar to the acceleration command curve in the acceleration section K1 shown in FIG. 2.

Further, in a case that the current command acceleration (an) is in the acceleration reducing section R3, even when an acceleration reduction curve is newly generated by the current command acceleration (an), the velocity does not exceed the target velocity v0 when the acceleration is zero, an acceleration increasing curve is generated so as to be similar to the acceleration increasing curve in the acceleration section K1 shown in FIG. 2 from the current command acceleration (an) to an upper limit acceleration (an upper limit value of an acceleration determined in advance for every object to be controlled). When reaching the upper limit acceleration, the command acceleration with constant acceleration is generated. When the residual velocity vz has become equal to or higher than the differential velocity vs in the acceleration increasing section R1 or the constant acceleration section R2, an acceleration reduction curve that the acceleration is reduced from the current command acceleration (an) to zero is generated.

FIG. 4-1 depicts a method of generating an acceleration command curve when the velocity is changed to be increased in the acceleration increasing section or the constant acceleration section. A1 denotes an acceleration command curve, A2 and A3 denote acceleration reduction curves, B1 denotes a velocity curve corresponding to the acceleration command curve A1, and B2 and B3 denote velocity curves corresponding to the acceleration reduction curves A2 and A3.

In FIG. 4-1, when the target-velocity change command (or) is input at a time t1 and the current command acceleration (an) is in the acceleration increasing section R1 or the constant acceleration section R2 of the acceleration command curve A1, the command generating unit 11 continues to use the current command acceleration (an).

Meanwhile, the residual-velocity calculating unit 12 calculates the residual velocity vz, which is a velocity increment when the acceleration is reduced from the current command acceleration (an) to zero according to the acceleration reduction curve A2 generated by the command generating unit 11. The differential-velocity calculating unit 13 calculates the differential velocity vs, which is a difference between the target velocity v0 and the current command velocity vn. The acceleration-reduction-start-timing determining unit 14 compares the residual velocity vz to the differential velocity vs, when vz≥vs is satisfied at a time t2, generates the acceleration reduction curve A3, and starts to reduce the acceleration.

FIG. 4-2 depicts a method of generating an acceleration command curve when the velocity is changed to be increased in the acceleration reducing section and exceeds the target velocity at zero acceleration. A11 denotes an acceleration command curve, A12 denotes an acceleration curve, B11 denotes a velocity curve corresponding to the acceleration command curve A11, and B12 denotes a velocity curve corresponding to the acceleration curve A12.

In FIG. 4-2, in a case that the target-velocity change command (or) is input at a time t11 and the current command acceleration (an) is in the acceleration reducing section R3 of the acceleration command curve A11, when an acceleration reduction curve is newly generated by the current command acceleration (an), and the velocity exceeds the target velocity v0 at zero acceleration, the command generating unit 11 continues to use the acceleration reduction curve for the current acceleration command curve A11 to generate the command acceleration (an). At a time t12 when the command acceleration (an) on the acceleration command curve A11 reaches zero acceleration, the command generating unit 11 regenerates the acceleration curve A12 to the target velocity v0 so as to be similar to the acceleration command curve in the acceleration section K1 shown in FIG. 2, and generates the command acceleration (an) according to the acceleration curve A12.

FIG. 4-3 depicts a method of generating an acceleration command curve when the velocity is changed to be increased in the acceleration reducing section and does not exceed the target velocity at zero acceleration. A21 denotes an acceleration command curve, A22 denotes an acceleration increasing curve, A22' denotes a constant acceleration curve, A22" denotes an acceleration reduction curve, B21 denotes a velocity curve corresponding to the acceleration command curve A21, B22 denotes a velocity curve corresponding to the acceleration increasing curve A22, B22' denotes a velocity curve corresponding to the constant acceleration curve A22', and B22" denotes a velocity curve according to the acceleration reduction curve A22".

In FIG. 4-3, in a case that the target-velocity change command (or) is input at a time t21 and the current command acceleration (an) is in the acceleration reducing section R1 of the acceleration command curve A21, when an acceleration reduction curve is newly generated by the current command acceleration (an), the velocity does not exceed the target velocity v0 at zero acceleration, the command generating unit 11 generates the acceleration increasing curve A22 from the current command acceleration (an) to an upper limit acceleration am so as to be similar to the acceleration increasing curve in the acceleration section K1 shown in FIG. 2 and generates the command acceleration (an) according to the acceleration increasing curve A22. When reaching the upper limit acceleration am, the constant acceleration curve A22' is generated and then the command acceleration (an) is generated according to the constant acceleration curve A22'. At a time t22 when the residual velocity vz has become equal to or higher than the differential velocity vs in the acceleration increasing curve A22 or the constant acceleration curve A22', the acceleration reduction curve A22" that the acceleration is reduced from the current command acceleration (an) to zero is generated.

Next, in a case that the target-velocity change command (or) is executed so that the velocity is reduced, when the current command acceleration (an) is in the acceleration increasing section R1 or the constant acceleration section R2, the current command acceleration (an) continues to be used. When the residual velocity vz has become equal to or higher than the differential velocity vs, the acceleration reduction curve is generated and the acceleration starts to be reduced.

Meanwhile, in a case that the target-velocity change command (or) is executed so that the velocity is reduced, when the current command acceleration is already in the acceleration reducing section R3, the current acceleration reduction curve continues to be used. When the velocity exceeds the target velocity v0 at the time the acceleration has become zero, a deceleration curve from a velocity at that time to the target velocity v0 is generated so as to be similar to the acceleration command curve in the deceleration section K3 shown in FIG. 2.

Figures 2, 5:
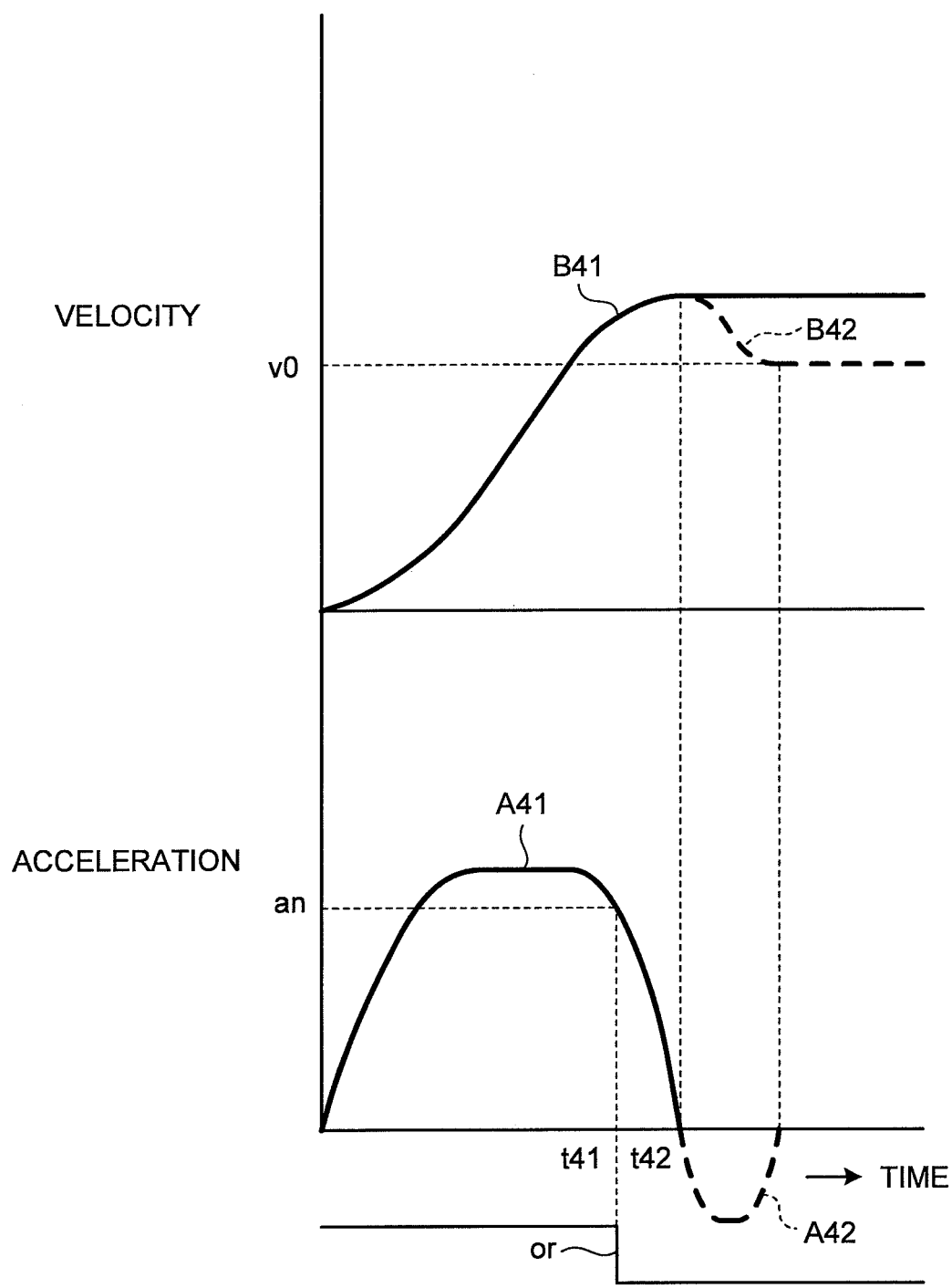

FIG. 5-1 depicts a method of generating an acceleration command curve when the velocity is changed to be reduced in the acceleration increasing section or the constant acceleration section. A31 denotes an acceleration command curve, A32 and A33 denote acceleration reduction curves, B31 denotes a velocity curve corresponding to the acceleration command curve A31, and B32 and B33 denote velocity curves corresponding to the acceleration reduction curves A32 and A33.

In FIG. 5-1, when the target-velocity change command (or) is input at a time t31 and the current command acceleration (an) is in the acceleration increasing section R1 or the constant acceleration section R2 of the acceleration command curve A31, the command generating unit 11 continues to use the current command acceleration (an).

Meanwhile, the residual-velocity calculating unit 12 calculates the residual velocity vz, which is a velocity increment when the acceleration is reduced from the current command acceleration (an) to zero according to the acceleration reduction curve A32 generated by the command generating unit 11. The differential-velocity calculating unit 13 calculates the differential velocity vs, which is a difference between the target velocity v0 and the current command velocity vn. The acceleration-reduction-start-timing determining unit 14 compares the residual velocity vz to the differential velocity vs, when vz≥vs is satisfied at a time t32, generates the acceleration reduction curve A33, and starts to reduce the acceleration.

FIG. 5-2 depicts a method of generating an acceleration command curve when the velocity is changed to be reduced in the acceleration reducing section. A41 denotes an acceleration command curve, A42 denotes a deceleration curve, B41 denotes a velocity curve corresponding to the acceleration command curve A41, and B42 denotes a velocity curve corresponding to the deceleration curve A42.

In FIG. 5-2, in a case the target-velocity change command (or) is input at a time t41 and the current command acceleration (an) is in the acceleration reducing section R3 of the acceleration command curve A41, when an acceleration reduction curve is newly generated by the current command acceleration (an), and the velocity exceeds the target velocity v0 at zero acceleration, the command generating unit 11 continues to use the acceleration reduction curve in the current acceleration command curve A41 to generate the command acceleration (an). When reaching a time t42 when the command acceleration (an) on the acceleration command curve A41 is zero, the command generating unit 11 regenerates the deceleration curve A42 from a velocity at that time to the target velocity v0 so as to be similar to the acceleration command curve in the deceleration section K3 shown in FIG. 2 and generates the command acceleration (an) according to the regenerated deceleration curve A42.

As described above, according to the first embodiment, an acceleration reduction curve is generated based on the time when the residual velocity vz has become equal to or higher than the differential velocity vs. Consequently, the acceleration reduction curve that realizes the target velocity v0 changed by the target-velocity change command (or) while the continuity with the current acceleration command curve is maintained can be generated. Even when the target-velocity change command (or) is input during acceleration, smooth operations can be realized while continuity in acceleration is maintained and excitation of vibrations can be prevented.

While the first embodiment described above has explained a method of using a universal cam curve as an acceleration command curve, as long as an acceleration section and a deceleration section can be divided respectively into three sections, that is, an acceleration increasing section, a constant acceleration section, and an acceleration reducing section, other shapes represented by polynomials can be used as the acceleration command curve.

Functions of the command generating unit 11, the residual-velocity calculating unit 12, the differential-velocity calculating unit 13, and the acceleration-reduction-start-timing determining unit 14 can be realized by causing a computer to execute programs in which instructions for performing processes in these units are described. When the computer is caused to execute the programs in which instructions for performing processes in the command generating unit 11, the residual-velocity calculating unit 12, the differential-velocity calculating unit 13, and the acceleration-reduction-start-timing determining unit 14, these programs can be executed by a stand-alone computer or by plural computers connected to a network in a distributed manner.

Figure 6:
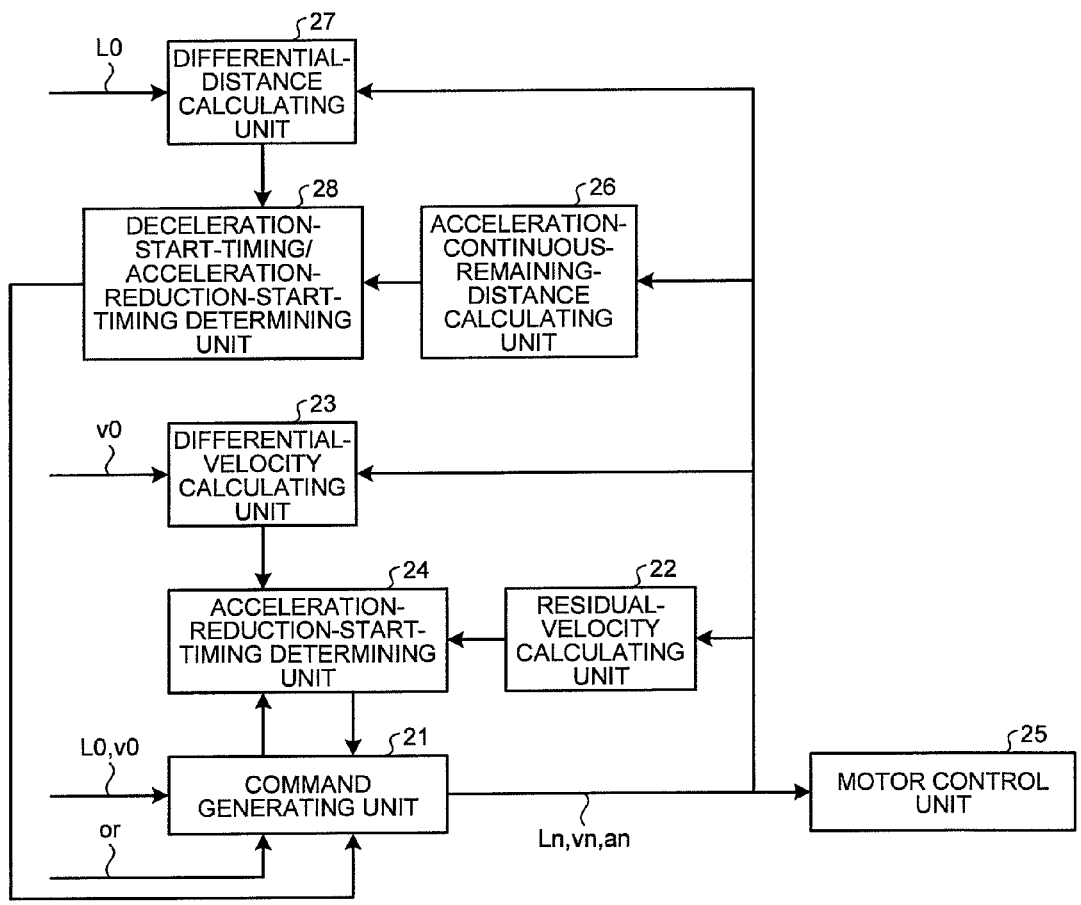
FIG. 6 is a block diagram of a schematic configuration of an acceleration/deceleration control device according to a second embodiment of the present invention.

FIG. 6 is a block diagram of a schematic configuration of an acceleration/deceleration control device according to a second embodiment of the present invention. In FIG. 6, the acceleration/deceleration control device includes a command generating unit 21, a residual-velocity calculating unit 22, a differential-velocity calculating unit 23, an acceleration-reduction-start-timing determining unit 24, an acceleration-continuous-remaining-distance calculating unit 26, a differential-distance calculating unit 27, and a deceleration-start-timing/acceleration-reduction-start-timing determining unit 28. The command generating unit 21, the residual-velocity calculating unit 22, the differential-velocity calculating unit 23, and the acceleration-reduction-start-timing determining unit 24 can be operated in the same manner as the command generating unit 11, the residual-velocity calculating unit 12, the differential-velocity calculating unit 13, and the acceleration-reduction-start-timing determining unit 14 in FIG. 1.

The acceleration-continuous-remaining-distance calculating unit 26 calculates a remaining distance Lz based on the command acceleration (an) generated by the command generating unit 21 when deceleration is stopped during acceleration. The remaining distance Lz corresponds to a moving distance to when acceleration is reduced from the current command acceleration an to zero according to an acceleration reduction curve generated by the command generating unit 21 and deceleration is stopped according to the deceleration stop curve generated by the command generating unit 21 when the acceleration has become zero.

The differential-distance calculating unit 27 calculates a differential distance Ls based on an externally supplied target position L0 and a command position Ln generated by the command generating unit 21. The differential distance Ls corresponds to a difference between the target position L0 and the current command position Ln.

The deceleration-start-timing/acceleration-reduction-start-timing determining unit 28 determines an acceleration reduction start timing of starting to reduce the command acceleration (an) according to the acceleration reduction curve generated by the command generating unit 21. The acceleration-reduction start timing can be earlier one of the time when the remaining distance Lz has become equal to or longer than the differential distance Ls and the time when the residual velocity vz has become equal to or higher than the differential velocity vs.

The acceleration/deceleration control device performs position control as motor control, and the motor control is performed such that a position when deceleration stops becomes a target position. When the deceleration starts to be stopped during acceleration, the acceleration may be discontinuous, which may excite vibrations. The current command acceleration (an) is thus reduced to zero during acceleration and it is determined whether a deceleration stop position is not over the target position L0 even when a deceleration stop curve is generated at a point when the acceleration has become zero (a remaining distance determination). The acceleration then starts to be reduced at earlier one of the time when conditions for the remaining distance determination are satisfied and the time when conditions for a residual velocity determination (whether the residual velocity vz becomes equal to or higher than the differential velocity vs) described in the first embodiment are satisfied. The residual velocity determination can be made in the same manner as that of the first embodiment.

Figure 7:
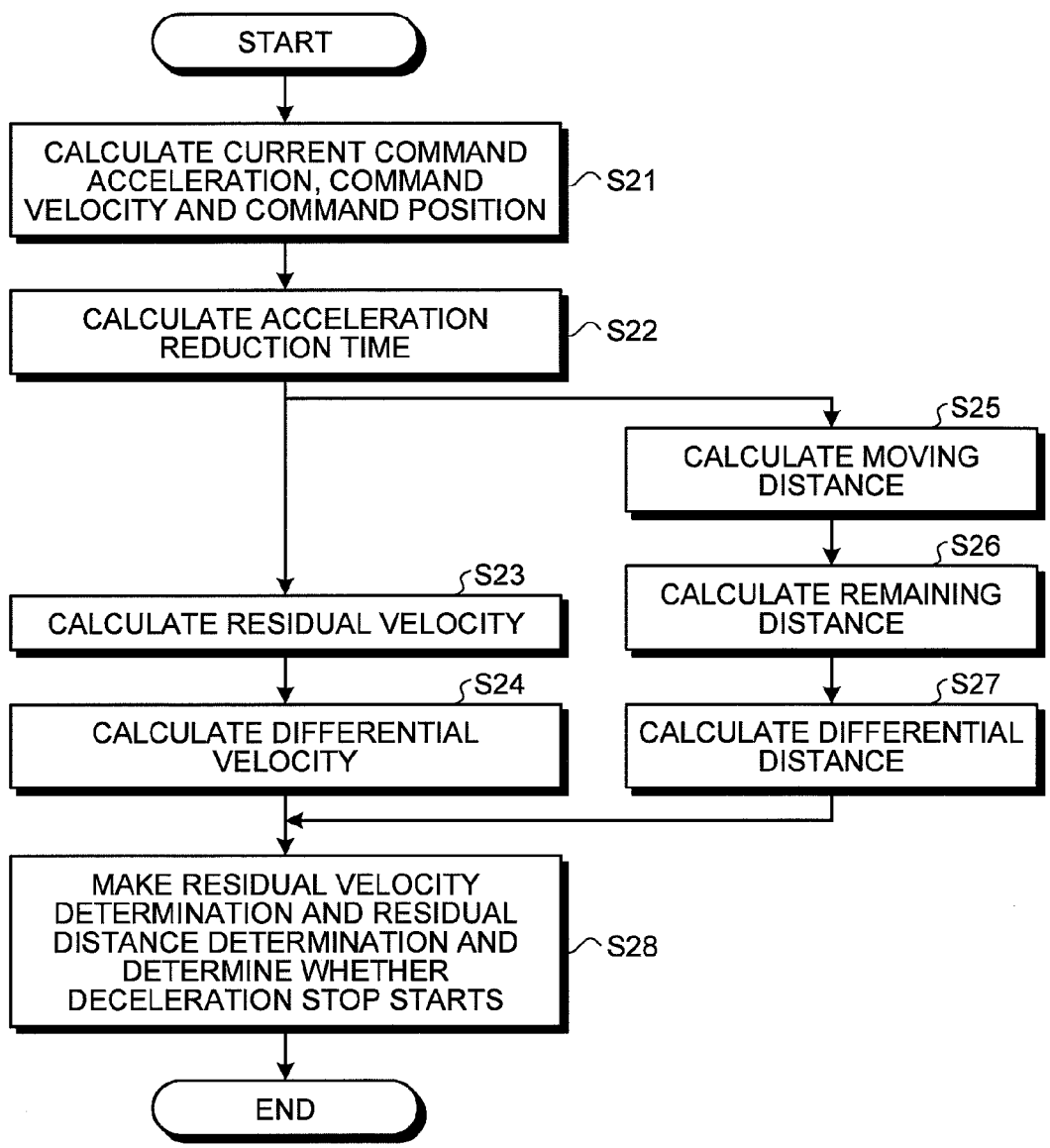
FIG. 7 is a flowchart of a process of determining start of deceleration stop in the acceleration/deceleration control device shown in FIG. 6.

FIG. 7 is a flowchart of a process of determining start of deceleration stop in the acceleration/deceleration control device shown in FIG. 6. In FIG. 7, when the target position L0 and the target velocity v0 are input to the command generating unit 21 of FIG. 6, this unit generates the acceleration command curve shown in FIG. 2 to calculate the command acceleration (an), the command velocity vn, and the command position Ln for every command generation period (Step S21), and the acceleration reduction time bt (Step S22). Further, the command generating unit 21 outputs the command acceleration (an) and the acceleration reduction time bt to the residual-velocity calculating unit 22 and the acceleration-continuous-remaining-distance calculating unit 26, the command velocity vn to the differential-velocity calculating unit 23, and the command position Ln to the differential-distance calculating unit 27.

The residual-velocity calculating unit 22 calculates the residual velocity vz corresponding to a velocity increment when the acceleration is reduced from the current command acceleration (an) to zero according to the acceleration reduction curve in the acceleration reducing section K3 shown in FIG. 2 (Step S23), and outputs the result to the acceleration-reduction-start-timing determining unit 24.

Next, the differential-velocity calculating unit 23 calculates the differential velocity vs=v0-vn, which is a difference between the target velocity v0 and the current command velocity vn for every command generation period (Step S24), and outputs the result to the acceleration-reduction-start-timing determining unit 24.

Meanwhile, the acceleration-continuous-remaining-distance calculating unit 26 calculates a moving distance Lz1 to a point of zero acceleration when an acceleration reduction curve from the current command acceleration (an) to zero acceleration is generated and a velocity increment vz1 to the point of zero acceleration. Because the velocity increment vz1 is the same as the residual velocity vz calculated by the residual-velocity calculating unit 22, the residual velocity vz calculated by the residual-velocity calculating unit 22 can be used. Further, the acceleration-continuous-remaining-distance calculating unit 26 also calculates a moving distance Lz2 when deceleration is stopped from the point of zero acceleration (a point with a velocity of vn+vz1 when the current command velocity is vn) to a velocity of zero (Step S25). This deceleration stop curve can be similar to the acceleration command curve in the deceleration section K3 shown in FIG. 2.

The acceleration is then reduced from the current command acceleration (an) to zero using these moving distances Lz1 and Lz2. Further, the acceleration-continuous-remaining-distance calculating unit 26 calculates the remaining distance Lz=Lz1+Lz2, which is a moving distance to when the velocity becomes zero when deceleration stops (Step S26), and outputs the result to the deceleration-start-timing/acceleration-reduction-start-timing determining unit 28. Because the acceleration is zero in the constant acceleration section, Lz1=0 is always satisfied.

Next, the differential-distance calculating unit 27 calculates the differential distance Ls=L0-Ln, which is a difference between the target position L0 and the current command position Ln for every command generation period (Step S27), and outputs the result to the deceleration-start-timing/acceleration-reduction-start-timing determining unit 28.

The acceleration-reduction-start-timing determining unit 24 then compares the residual velocity vz to the differential velocity vs for every command generation period for determining whether the acceleration reduction starts, that is, for making the residual velocity determination (Step S28), and outputs an acceleration-reduction start signal for instructing start of the acceleration reduction to the command generating unit 21. The acceleration-reduction-start-timing determining unit 24 determines the start of the acceleration reduction when vz≥vs is satisfied and starts to reduce the command acceleration (an) according to the acceleration reduction curve generated by the command generating unit 21.

The deceleration-start-timing/acceleration-reduction-start-timing determining unit 28 compares the remaining distance Lz to the differential distance Ls for every command generation period for making the remaining distance determination whether the acceleration reduction starts (Step S28) and outputs an acceleration-reduction start signal for instructing the start of the acceleration reduction to the command generating unit 21. The deceleration-start-timing/acceleration-reduction-start-timing determining unit 28 determines the start of the acceleration reduction when Lz≥Ls is satisfied and starts to reduce the command acceleration (an) according to the acceleration reduction curve generated by the command generating unit 21.

When the acceleration-reduction start signal is transmitted from the acceleration-reduction-start-timing determining unit 24 or the deceleration-start-timing/acceleration-reduction-start-timing determining unit 28, the command generating unit 21 starts to reduce the acceleration.

When the acceleration-reduction start signal from the acceleration-reduction-start-timing determining unit 24 is transmitted earlier, the command generating unit 21 starts to reduce the acceleration reduction according to the acceleration reduction curve. A process in the deceleration-start-timing/acceleration-reduction-start-timing determining unit 28 continues and the deceleration stop curve starts to be generated when Lz≥Ls is satisfied.

Meanwhile, when the acceleration-reduction start signal from the deceleration-start-timing/acceleration-reduction-start-timing determining unit 28 is transmitted earlier, the command generating unit 21 starts to reduce the acceleration according to the acceleration reduction curve and starts to generate the deceleration stop curve when the acceleration becomes zero.

Figure 8:
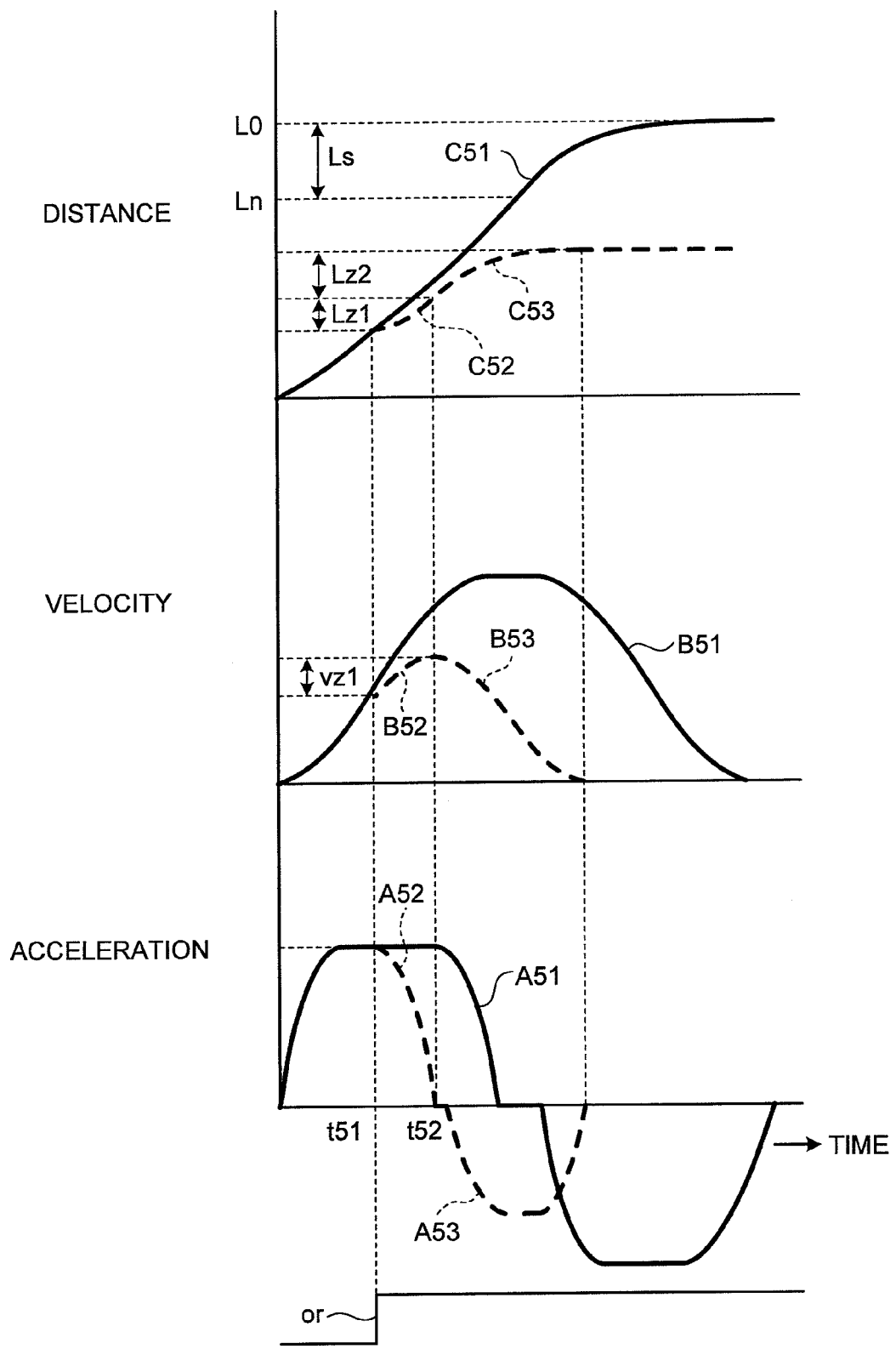
FIG. 8 depicts a method of determining start of deceleration stop in the acceleration/deceleration control device shown in FIG. 6.

FIG. 8 depicts a method of determining start of deceleration stop in the acceleration/deceleration control device shown in FIG. 6. A51 denotes an acceleration command curve, A52 denotes an acceleration reduction curve, and A53 denotes a deceleration stop curve. B51 denotes a velocity curve corresponding to the acceleration command curve A51, B52 denotes a velocity curve corresponding to the acceleration reduction curve A52, and B53 denotes a velocity curve corresponding to the deceleration stop curve A53. C51 denotes a moving distance curve corresponding to the acceleration command curve A51, C52 denotes a moving distance curve corresponding to the acceleration reduction curve A52, and C53 denotes a moving distance curve corresponding to the deceleration stop curve A53.

In FIG. 8, when the target-velocity change command (or) is input at a time t51, the residual-velocity calculating unit 22 calculates the residual velocity vz, which is a velocity increment when the acceleration is reduced from the current command acceleration (an) to zero according to the acceleration reduction curve A52 generated by the command generating unit 21. The differential-velocity calculating unit 23 calculates the differential velocity vs, which is a difference between the target velocity v0 and the current command velocity vn. The acceleration-reduction-start-timing determining unit 24 then compares the residual velocity vz to the differential velocity vs and transmits an acceleration-reduction start signal to the command generating unit 21 when vz≥vs is satisfied.

When the target-velocity change command (or) is input at the time t51, the acceleration-continuous-remaining-distance calculating unit 26 calculates the moving distance Lz1 to the point of zero acceleration when the acceleration reduction curve from the current command acceleration (an) to zero acceleration is generated, the velocity increment vz1 to the point with zero acceleration, and the moving distance Lz2 when deceleration is stopped from the point with zero acceleration to a velocity of zero. Consequently, the remaining distance Lz=Lz1+Lz2 is calculated. The differential-distance calculating unit 27 calculates the differential distance Ls, which is a difference between the target position L0 and the current command position Ln. The deceleration-start-timing/acceleration-reduction-start-timing determining unit 28 compares the remaining distance Lz to the differential distance Ls and transmits an acceleration-reduction start signal to the command generating unit 21 when Lz≥Ls is satisfied.

When the command generating unit 21 receives an acceleration-reduction start signal from the acceleration-reduction-start-timing determining unit 24 or the deceleration-start-timing/acceleration-reduction-start-timing determining unit 28, the command generating unit 21 starts to reduce the acceleration.

In this manner, according to the second embodiment described above, acceleration starts to be reduced based on the time when the remaining distance Lz has become equal to or longer than the differential distance Ls. Therefore, even when deceleration must be stopped during acceleration in a case of changing a velocity during an operation, the acceleration can be continuous and excitation of vibrations of mechanical systems can be prevented.

Functions of the command generating unit 21, the residual-velocity calculating unit 22, the differential-velocity calculating unit 23, the acceleration-reduction-start-timing determining unit 24, the acceleration-continuous-remaining-distance calculating unit 26, the differential-distance calculating unit 27, and the deceleration-start-timing/acceleration-reduction-start-timing determining unit 28 can be realized by causing a computer to execute programs in which instructions for performing processes in the respective units are described. When the computer is caused to execute the programs in which instructions for performing processes in the command generating unit 21, the residual-velocity calculating unit 22, the differential-velocity calculating unit 23, the acceleration-reduction-start-timing determining unit 24, the acceleration-continuous-remaining-distance calculating unit 26, the differential-distance calculating unit 27, and the deceleration-start-timing/acceleration-reduction-start-timing determining unit 28 are described, these programs can be also executed by a stand-alone computer or by plural computers connected to a network in a distributed manner.

INDUSTRIAL APPLICABILITY

As described above, the acceleration/deceleration control device according to the present invention is suitable for a method of controlling positions or velocities of mechanical systems, such as a mounting machine, semiconductor manufacturing device, injection molding machine, robot, machine tool, packaging machine, printing machine, and transporting machine.

The invention claimed is:

1. An acceleration and deceleration control device that generates a command acceleration that is a command value of an acceleration and a command velocity that is a command value of a velocity so as to reach a first target velocity according to an acceleration command curve, the acceleration and deceleration control device comprising:
a command generating unit that generates an acceleration command curve for providing the command acceleration, and generates an acceleration reduction curve when a target-velocity change command is input during acceleration, wherein the target-velocity change command inputs a value of a second target velocity different from the first target velocity;
a residual-velocity calculating unit that calculates a residual velocity that corresponds to a velocity increment when the acceleration is reduced from a current command acceleration to zero according to an acceleration reduction curve generated by the command generating unit;
a differential-velocity calculating unit that calculates a differential velocity corresponding to a difference between the second target velocity and a current command velocity; and
an acceleration-reduction-start-timing determining unit that causes the command generating unit to generate an acceleration reduction curve based on a time when the residual velocity has become equal to or higher than the differential velocity and starts to reduce the command acceleration according to the acceleration reduction curve.

2. The acceleration and deceleration control device according to claim 1, comprising:
an acceleration-continuous-remaining-distance calculating unit that reduces an acceleration from a current command acceleration to zero according to the acceleration reduction curve generated by the command generating unit when deceleration is stopped during acceleration, and calculates a remaining distance corresponding to a moving distance to when deceleration is stopped according to a deceleration stop curve generated by the command generating unit when the acceleration has become zero;
a differential-distance calculating unit that calculates a differential distance corresponding to a difference between a target position and a current command position; and
a deceleration-start-timing and acceleration-reduction-start-timing determining unit that causes the command generating unit to generate the acceleration reduction curve based on earlier one of a time when the remaining distance has become equal to or longer than the differ-
ential distance and a time when the residual velocity has become equal to or higher than the differential velocity and starts to reduce the command acceleration according to the acceleration reduction curve.

3. The acceleration and deceleration control device according to claim 2, wherein
the command generating unit starts to reduce the command acceleration according to the acceleration reduction curve when the time when the residual velocity has become equal to or higher than the differential velocity is earlier than the time when the remaining distance has become equal to or longer than the differential distance, and starts to generate a deceleration stop curve when the remaining distance has become equal to or longer than the differential distance, and
the command generating unit starts to reduce the command acceleration according to the acceleration reduction curve when the time when the remaining distance has become equal to or longer than the differential distance is earlier than the time when the residual velocity has become equal to or higher than the differential velocity, and starts to generate the deceleration stop curve when the acceleration has become zero.

4. The acceleration and deceleration control device according to claim 1, wherein the acceleration command curve includes an acceleration section and a deceleration section, the acceleration section and the deceleration section include respectively an acceleration increasing section, a constant acceleration section, and an acceleration reducing section, and the acceleration increasing section and the acceleration reducing section are set independently from each other.

5. The acceleration and deceleration control device of claim 4, wherein
the command generating unit generates the acceleration reduction curve and starts to reduce an acceleration when the residual velocity has become equal to or higher than the differential velocity in a case that a velocity is changed to be increased in the acceleration increasing section or the constant acceleration section,
the command generating unit generates an acceleration curve to a target velocity when the acceleration is zero in a case that the velocity is changed to be increased in the acceleration reducing section and exceeds the target velocity when the acceleration is zero,
the command generating unit generates an acceleration increasing curve from a current acceleration to an upper limit acceleration and generates an acceleration reduction curve for reducing the acceleration from the current acceleration to zero when the residual velocity has become equal to or higher than the differential velocity in a case that the velocity is changed to be increased in the acceleration reducing section and does not exceed a target velocity when the acceleration is zero,
the command generating unit generates the acceleration reduction curve and starts to reduce the acceleration when the residual velocity has become equal to or higher than the differential velocity in a case that the velocity is changed to be reduced in the acceleration increasing section or the constant acceleration section, and
the command generating unit generates a deceleration curve to a target velocity when the acceleration is zero in a case that the velocity is changed to be reduced in the acceleration reducing section and exceeds the target velocity when the acceleration is zero.

* * * * *